United States Patent [19]

Nelson

[11] Patent Number: 4,879,832

[45] Date of Patent: Nov. 14, 1989

[54] FISHING LURE/HOOK RECEPTACLE

[76] Inventor: Maynard E. Nelson, 160 S. Estates Dr., Salina, Kans. 67401

[21] Appl. No.: 248,198

[22] Filed: Sep. 23, 1988

[51] Int. Cl.$^4$ .............................................. A01K 97/06
[52] U.S. Cl. ..................................................... 43/25.2
[58] Field of Search ............................... 43/25.2, 57.1

[56] References Cited

U.S. PATENT DOCUMENTS

| 2,285,888 | 6/1942 | Benton | 43/25.2 |
| 3,224,134 | 12/1965 | Holcombe | 43/57.1 |
| 3,711,985 | 1/1973 | Winters | 43/25.2 |
| 4,383,385 | 5/1983 | Myers | 43/57.1 |
| 4,667,433 | 5/1987 | Thompson | 43/25.2 |
| 4,681,220 | 7/1987 | Beneke | 43/25.2 |

FOREIGN PATENT DOCUMENTS 2187721  9/1987  United Kingdom ................ 43/57.1

Primary Examiner—Gene P. Crosby
Attorney, Agent, or Firm—Phillip A. Rein

[57] ABSTRACT

This invention relates to a fishing lure/hook receptacle operable to receive a lure member therein attached to a fishing line or a leader member. The fishing lure/hook receptacle can be directly attached to the fishing line on the end of a fishing rod and reel assembly to provide a compact enclosure to prevent the same from becoming entangled with trees, underbrush, etc. The fishing lure/hook receptacle includes a main receptacle member or tubular shape having a receptacle cover member releasably connected thereto. The receptacle cover member is provided with a conical body member of dome shape having a slot section extended from a central portion down one complete side thereof. The slot section is adapted to receive a fishing line or leader member therewithin and to clamp against the same when in the enclosed sealed condition mounted on the main receptacle member. The slot section has a top slot portion integral with an arcuate slot portion which are moved towards a clamping or closed condition about the fishing line when in the usage condition mounted on the main receptacle member.

4 Claims, 1 Drawing Sheet

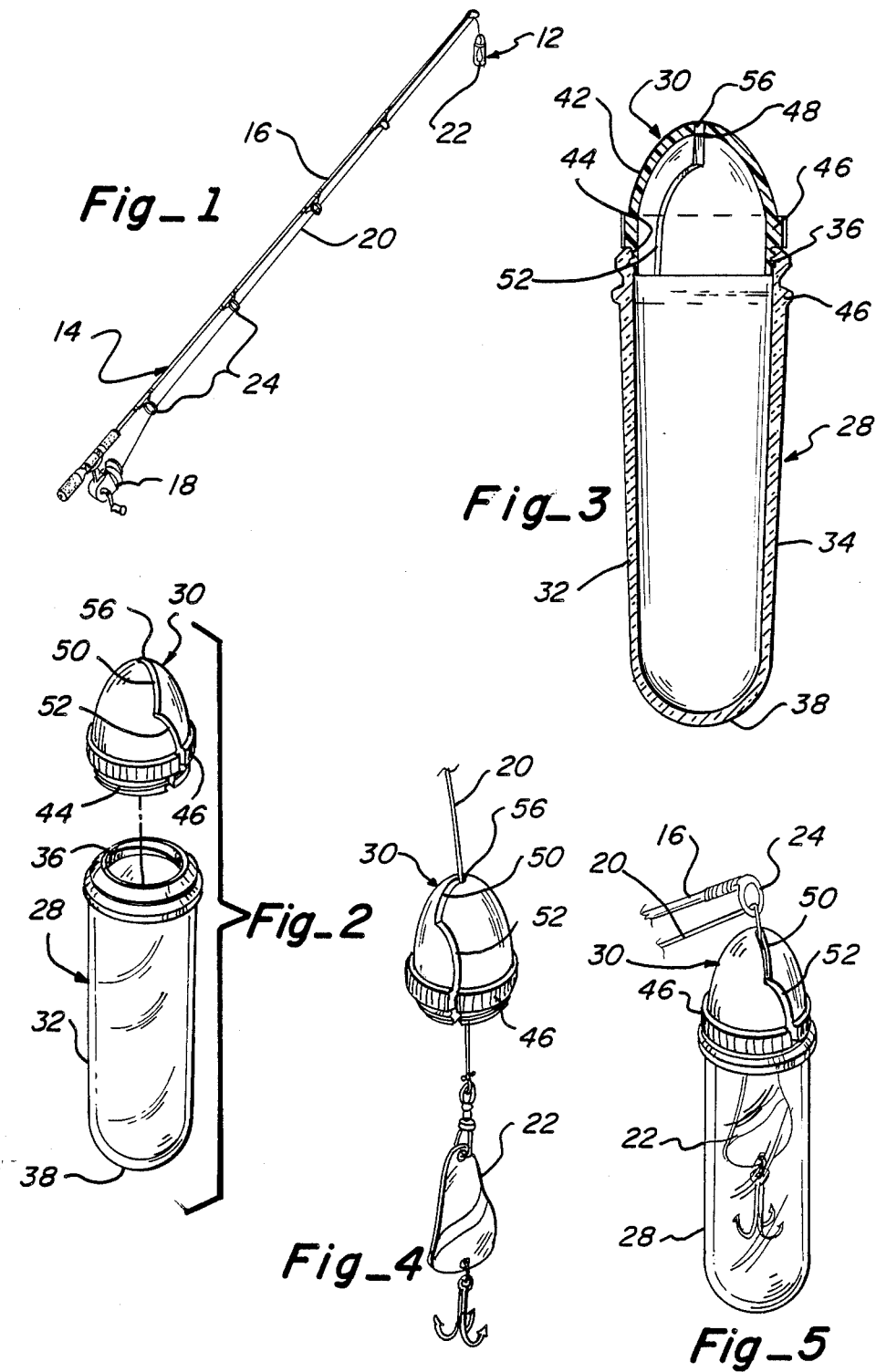

FISHING LURE/HOOK RECEPTACLE

PRIOR ART

A patent search on this invention revealed the following United States Patents:

| U.S. Pat. Nos. | Invention | Inventor |
| --- | --- | --- |
| 2,691,840 | BAIT RETAINER AND HOOK PROTECTIVE DEVICE FOR FISHING TACKLES | Paul E. Smith |
| 2,767,502 | ROD-MOUNTABLE TRANSPARENT CASE FOR FISHING LURES | Richard R. Reynolds |
| 2,783,875 | FISHING TACKLE RECEPTACLE | Tony A. Shabarick |
| 3,273,279 | FISH LURE HOLDER | Norton et al |
| 3,897,650 | LURE CONTAINER | Robert G. Pilston |
| 4,441,274 | FISHING LURE HOLDER | John L. Masur |
| 4,681,220 | CONTAINER FOR AN OFFSHORE FISHING LURE | Robert G. Beneke |

The Norton et al patent discloses a fishing lure holder wheel is substantially different in structure. The Shabarick patent discloses a fishing tackle receptacle having cylindrical fishing lure receptacles with a rotatable cylinder to obtain access thereto but is not drawn to the features of my invention.

The Pilston patent discloses a lure container including a transparent cylindrical tube to hold lures and having a removable lid structure with means thereon to prevent loss of subject lid.

The Reynolds and Masur patents disclose fishing lure containers, each being connectable to a fishing pole, to hold the respective lures in an enclosed and protected condition so the respective lure does not have to be removed from the fishing line at time of transport or storage.

The Smith patent teaches another fishing pole attachment structure having a cylindrical member tapered at one end and open at the other having an elongated slot. This structure is operable to receive the fishing lure therein on moving the attached leader line through the slot and tension on the fishing line holds the lure within this protective cylindrical housing.

The Beneke patent discloses a transparent cylindrical housing having a removable cap member with a slot to train a leader line therethrough.

PREFERRED EMBODIMENT OF THE INVENTION

In one preferred embodiment of this invention, a fishing lure/hook receptacle is provided to be attached to an outer end of a fishing line to enclose a fishing hook and/or lure member therein in an enclosed protective manner. The fishing lure/hook receptacle includes a main receptacle member having a receptacle cover member releasably connected thereto. The main receptacle member is provided with a tubular shaped body member having a side wall integral with an end wall and female connector threads on an upper inner surface thereof. The main receptacle member can be constructed of a clear plastic material so as to readily observe a fishing lure member contained therein. The receptacle cover member includes a conical body member having male connector threads on one end thereof; an outer ridge section for ease of grasping and rotating the entire receptacle cover member; and a elongated slot section extended from a central portion thereof downwardly along one side thereof. The male connector threads are adapted to be engagable with the connector threads on the main receptacle member in a sealing and enclosed manner. The slot section is provided with a radially extended top slot portion integral with an arcuate slot portion which is offset from the top slot portion. The top slot portion is provided with an exit area portion at the centermost upper portion thereof to receive a fishing line or leader therethrough. The receptacle cover member is sized so that, on tightening the same on the main receptacle member, the slot section tends to decrease in width so as to clamp the fishing line extended therein in a secure manner to hold the fishing lure member in a desired suspended position within the main receptacle member.

OBJECTS OF THE INVENTION

One object of this invention is to provide a fishing lure/hook receptacle including a main receptacle member constructed of a transparent material to observe a lure member contained therein and having a receptacle cover member attachable to the main receptacle member and being color coded to designate the type of fishing lure contained therein.

One further object of this invention is to provide a fishing lure/hook receptacle including a main receptacle member with a receptacle cover member releasably connected thereto having a slot section to receive a fishing line therein and operable when mounted on the main receptacle member to clamp onto the fishing line.

One other object of this invention is to provide a fishing lure/hook receptacle including a main receptacle member adapted to releasably receive a receptacle cover member thereon with the cover member having an irregular slot section adapted to receive and clamp onto a fishing line therein when in a tightened enclosed condition on the main receptacle member.

Still, one further object of this invention is to provide a transparent fishing lure/hook receptacle which is economical to manufacture; simple to use; readily reusable; and color coded to indicate the type of fishing hook and/or lure member contained therein.

Various other objects, advantages and features of the invention will become apparent to those skilled in the art from the following discussion, taken in conjunction with the accompanying drawings, in which:

FIG. 1 is a perspective view of a fishing rod and reel structure having a fishing lure/hook receptacle of this invention connected thereto;

FIG. 2 is a perspective view of the fishing lure/hook receptacle of this invention illustrating a receptacle cover member in an exploded position;

FIG. 3 is an enlarged longitudinal sectional view of the fishing lure/hook receptacle of this invention;

FIG. 4 is a perspective view of the receptacle cover member of this invention illustrating a fishing lure with a leader line connected thereto shown in an inserted position with the receptacle cover member; and FIG. 5 is a perspective view of the fishing lure/hook receptacle of this invention illustrated as holding and enclosing a fishing lure member attached to a fishing line adjacent to an outer end tip portion of the fishing rod and reel structure.

The following is a discussion and description of preferred specific embodiments iof the fishing lure/hook receptacle of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail and, in particular to FIG. 1, a fishing lure/hook receptacle of this invention, indicated generally at 12, is shown as attached to a fishing rod and reel assembly 14. The fishing rod and reel assembly 14 includes a pole member 16; a reel member 18 mounted near a handle portion of the pole member 16; a fishing line 20 wound on the reel member 18; and a lure member 22 secured to an outer end of the fishing line 20. The pole member 16 is provided with a plurality of spaced eyelets 24 having the fishing line 20 trained therethrough in a conventional manner.

The fishing lure/hook receptacle 12 includes a main receptacle member 28 having a receptacle cover member 30 releasably connected thereto. The main receptacle member 28 is of a tubular shape having a body member 32 preferably constructed of a transparent glass or plastic material to enable one to observe a fishing hook or lure member 22 contained therein. The main receptacle member 28 includes a body member 32 having a side wall 34 integral with a conical end wall 38 and female internal connector threads 36 at an outer portion of the body member 32. At a position adjacent the connector threads 36 is formed a ridge section 40 for ease of holding and grasping same when attaching or disconnecting the receptacle cover member 30 thereto.

The receptacle cover member 30 is formed with a conical body member 42 of generally domed shape having (1) male connector threads 44 adjacent an open end thereof; (2) an outer ridge section 46 formed with serrations for ease of grasping and rotating of the receptacle cover member 30; and (3) a slot section 48 extended from an uppermost portion of the conical body member 42 downwardly extended therefrom through the outer ridge section 46 and the male connector threads 44. The male connector threads 44 are of a slightly greater size than the connector threads 36 on the main receptacle member 28 to achieve a closing of the slot section 48 when in the mounted condition as noted in FIG. 5. This causes a clamping about the fishing line 20 as will be explained.

The slot section 48 is provided with a top slot portion 50 integral with an arcuate slot portion 52. The top slot portion 50 is provided with a central exit area portion 56 through which the fishing line 20 is trained as shown in FIG. 4. The arcuate slot portion 52 extends laterally of the top slot portion 50 which extends radially so as to aid in holding the fishing line 20 in the exit area portion 56 until the cover member 30 is placed on the main receptacle member 28 so as to clamp about the fishing line 20.

The receptacle cover member 30 may be constructed of a color coded plastic material so as to readily identify the fishing hooks or lure members 22 contained therein. For example, the color red of a receptacle cover member 30 may indicate that fly fishing lures are contained therein whereupon the color blue may indicate bass fishing hooks or the like are contained therein.

USE AND OPERATION OF THE INVENTION

In the use and operation of the fishing lure/hook receptacle 12 of this invention, it is illustrated in FIG. 1 as attached to the fishing line 20 at an outer end of the fishing rod and reel assembly 14 and provides an enclosure for the fishing lure 22. This is especially desirable when a fisherman utilizing the fishing rod and reel assembly 14 is traveling through wooded or brush areas whereupon the fishing lure/hook receptacle 12 prevents a normally exposed hook member or lure member 22 from being entangled in the brush, weeds, trees, and the like.

As noted in FIG. 4, whereupon a fishing line 20 has a lure member 22 connected thereto, the fishing line 20 is trained through the slot section 48 first and, more particularly, through the arcuate slot portion 52. It is noted that the fishing line 20 is moved to extend upwardly and outwardly from the exit area portion 56.

Next, the main receptacle member 128 can be placed about the lure member 22 with the fishing line 20 attached thereto as noted in FIG. 5. Thereupon, a rotation of the main receptacle member 28 relative to the receptacle cover member 30 achieves an engagement of the connector threads 36, 44. On a final tightening of the receptacle cover member 30 by rotation thereof, it is noted that the slot section 48 closes causing a clamping of the fishing line 20 within the slot section 48 and, more specifically, within the exit area portion 56.

It is obvious that a plurality of the fishing hook/lure receptacle 12 can be utilized to store fishing lure members 22 therein when attached to a leader line and numerous ones can be carried in a fishing tackle box which maintains the fishing lures 22 separately and prevents their entanglement with each other.

The fishing lure/hook receptacle presents a safety feature in that the hook members and lures are enclosed and protected so as to not injure others when proceeding along a path or the like to a fishing location. Also, a plurality of fishing rod and reels can be conveyed in a car, pick-up, or station wagon without entanglement as all of the fishing hooks/lures are enclosed in the fishing lure/hook receptacle of this invention.

The fishing lure/hook receptacle of this invention is simple to use; economical to manufacture; sturdy in construction; and substantially maintenance free.

While the invention has been described in conjunction with preferred specific embodiments thereof, it will be understood this description is intended to illustrate and not to limit the scope of the invention, which is defined by the following claims:

I claim:

1. A fishing lure/hook receptacle operable to receive a fishing lure member attached to a fishing line therein, comprising:
    (a) a main receptacle member;
    (b) a receptacle cover member releasably mounted on said main receptacle member;
    (c) said receptacle cover member having a slot section extended through one side thereof to receive the fishing line therethrough;
    (d) said receptacle cover member when mounted on said main receptacle member operates to decrease a width of said slot section to clamp onto the fishing line; and
    (e) said slot section is provided with a top slot portion integral with an offset arcuate slot portion whereupon said fishing line can be trained through said arcuate slot portion to said top slot portion.

2. A fishing lure/hook receptacle as described in claim 1, wherein:
   (a) said top slot portion is provided with an uppermost exit area portion to receive the fishing line therethrough and to clamp thereabout when said receptacle cover member is securely mounted on said main receptacle member.

3. A fishing lure/hook receptacle as described in claim 1, wherein:
   (a) said top slot portion extended radially from a top point of said receptacle cover member.

4. A fishing lure/hook receptacle as described in claim 1, wherein:
   (a) said offset slot portion extended laterally from said top slot portion to and in hindering unintentional lateral movement of the fishing line from said slot section when interconnecting said receptacle cover member to said main receptacle cover member.

* * * * *